United States Patent [19]
Kostanski

[11] Patent Number: 5,829,376
[45] Date of Patent: Nov. 3, 1998

[54] OUTRIGGER WATERCRAFT

[76] Inventor: Jerzy Kostanski, 4281 Madeley Road, North Vancouver, British Columbia, Canada, V7N 9E1

[21] Appl. No.: 788,570

[22] Filed: Jan. 24, 1997

[51] Int. Cl.[6] ....................................................... B63B 1/00
[52] U.S. Cl. ............................................... 114/61; 114/123
[58] Field of Search .............................. 114/61, 123, 288, 114/289, 290

[56] References Cited

U.S. PATENT DOCUMENTS

| | | | |
|---|---|---|---|
| 1,710,625 | 4/1929 | Kapigan | 114/123 |
| 5,120,249 | 6/1992 | Fonda | 114/61 |
| 5,642,682 | 7/1997 | Peirce | 114/123 |

*Primary Examiner*—Stephen Avila

[57] ABSTRACT

A boat has a catamaran hull with a pair of outrigger floats supported at opposite sides of the hull on support arms telescopically slidable within tubes extending across the interior of the hull for displacing the floats between extended and retracted positions. Opposite sides of the hull have recesses with shapes complementary to inner sides of the floats to allow the floats to nest snugly in the recesses on retraction of the floats. When the floats are retracted, the hull and the floats form a composite streamlined hull surface contour. The floats are shaped to produce aerodynamic thrust directed towards the hull when the floats are extended.

8 Claims, 6 Drawing Sheets

OUTRIGGER WATERCRAFT

BACKGROUND TO THE INVENTION

1. Field of the Invention

The present invention relates to a water-craft having a hull and an outrigger body, and is useful in particular, but not exclusively, for a catamaran which includes a pair of outrigger bodies.

2. Summary of the Prior Art

Water-craft, such as sailing and motor boats which include a hull and at least one outrigger body, are known. For example, U.S. Pat. No. 5,235,925 (Farrier) discloses a trimaran which includes a hull and two outrigger bodies attached to the hull by means of respective arm structures. The arm structures are designed so that, when the trimaran is under way, the two outrigger bodies are rigidly held at a fixed distance outboard of the hull. However, when the water-craft is brought into a marina, the outrigger bodies can be retracted to lay against the sides of the hull. This reduces the overall width of the water-craft, thereby facilitating easier docking and trailering of the craft.

U.S. Pat. No. 5,277,142 (Connor) discloses a variable-beam catamaran having a central bridge-deck and a pair of side hulls interconnected by lateral suspension arms. The suspension arms are pivotally connected to the bridge-deck and the side hulls, so that the hulls can be moved between a substantially horizontal locked position and a retracted position beneath the bridge-deck, while maintaining the side hulls in a substantially vertical orientation. With this arrangement, the side hulls can be locked in the horizontal position while the craft is under way. However, when the craft enters a marina, the side hulls can be retracted underneath the bridge-deck to reduce the width of the water-craft to facilitate ease of docking.

It is a disadvantage of these prior systems that the retraction and extrusion of the outrigger bodies requires access to the arms and therefore cannot be effected remotely, e.g. from the cockpit, and also that they involve relatively complicated mechanisms and, consequentially, relatively extensive maintenance.

SUMMARY OF THE INVENTION

An object of the present invention is to provide a water-craft in which the separation between the hull and an outrigger body can be adjusted while the craft is under way.

Another object of the present invention is to provide a water-craft in which an outrigger can be moved between an extended position and a retracted position in which the effects of wind and water resistance are minimized.

According to the present invention, a water-craft comprises a catamaran hull comprising two hull members connected by a bridge and a pair of elongate outrigger bodies. Each outrigger body is operatively mounted in parallel relation to the hull and laterally movable with respect to the hull between an extended position and a retracted position. The hull members and the outrigger bodies are shaped so that when each outrigger body is in the retracted position, an outboard surface of that outrigger body co-operate a respective one of the hull members to define a composite streamlined hull surface contour.

When the outrigger body is fully retracted into the recess of the hull, it no longer acts as an outrigger. Progressively increasing stability can be obtained by moving the outrigger bodies outwards towards the fully extended positions.

Support arm are slidably mounted to the hull for lateral movement of the support arms between extended positions and a retracted positions. The elongate outrigger bodies are mounted on the free ends of the support arms in fixed parallel relation to the hull. The elongate outrigger bodies fit of snugly against opposite sides of the hull such that the hull when retracted, and the outrigger bodies co-operate to define the composite streamlined hull surface contour. The separation between each outrigger body and the hull can be freely adjusted by extending or retracting the arms, without altering the parallel relationship between the hull and the outrigger bodies. This arrangement allows the separation between the outrigger bodies and the hull to be adjusted while the craft is under way.

Slider tubes are rigidly affixed to the hull. A base or inner end of each support arm is slidably disposed within a respective one of the tubes, so that outer wall of the support arms bear against inner walls of the slider tubes. By this means, forces can be transferred from the outrigger bodies to the hull (or vice-versa), via the support arm and slider tube, while angular rotation of the support arm with respect to the slider tube (and thus also the hull) is substantially prevented.

Each outrigger body defines a hydrofoil shape in planform, such that water flowing longitudinally with respect to the outrigger bodies can generate hydrodynamic thrust forces generally directed the towards the hull. By this means, the conventional requirement for a daggerboard or the like is effectively eliminated.

Respective first and second outrigger displacement drives are provided for independently moving the outrigger bodies to any desired position between respective retracted and extended positions, e.g. while the water-craft is under way.

BRIEF DESCRIPTION OF THE DRAWINGS

Further objects, features and advantages of the present invention will be more readily apparent from the following detailed description thereof given, by way of example, with reference to the appended drawings, in which.

DETAILED DESCRIPTION OF THE PREFERRED EMBODIMENT

Figure 1:
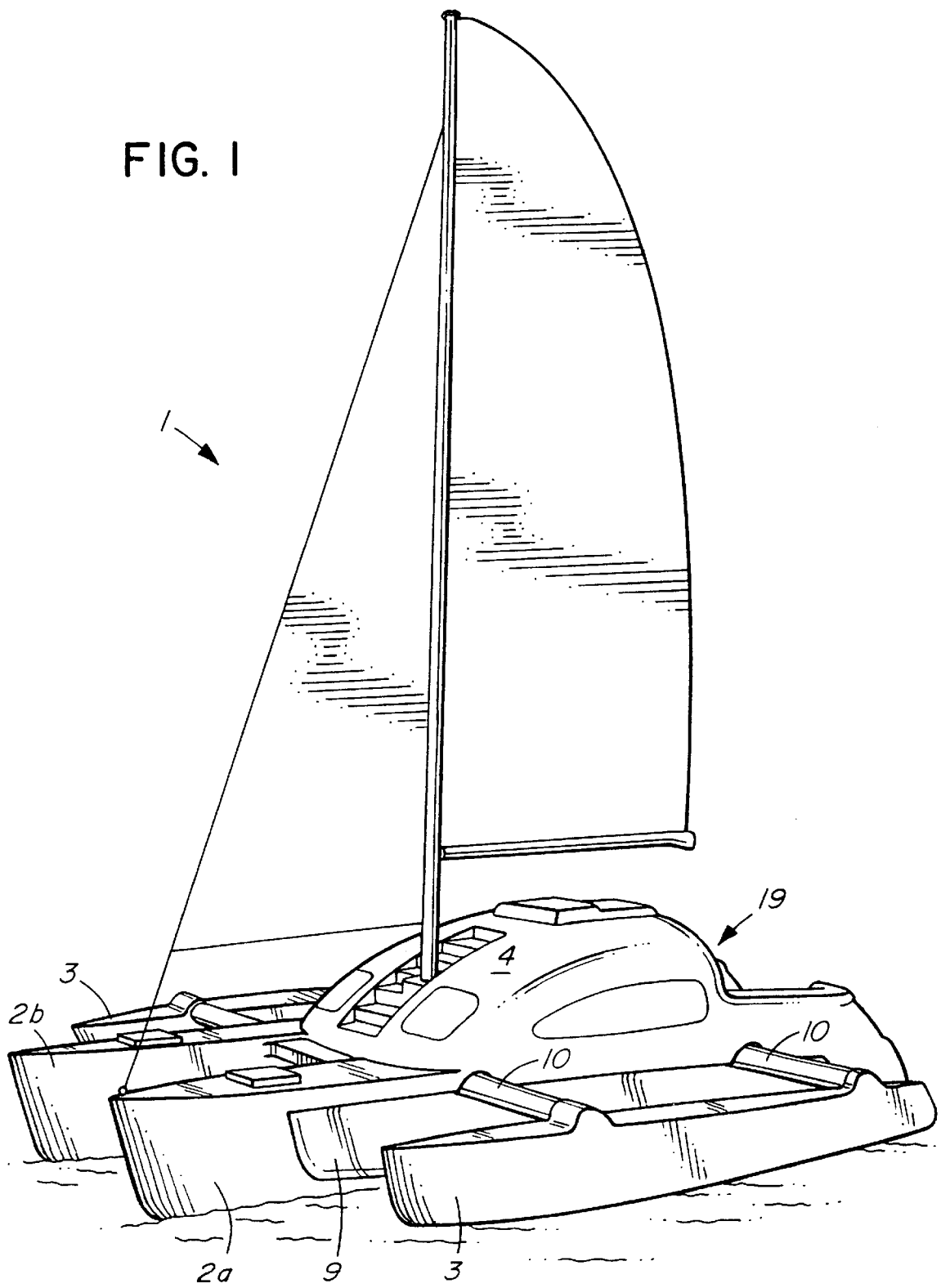
FIG. 1 shows a perspective view of a water-craft in accordance with an embodiment of the present invention.

Referring to FIG. 1, a water-craft 1 in accordance with the present invention includes a hull 2 and a pair of elongate outrigger bodies or floats 3 attached to the hull 2. The water-craft 1, as shown in the drawings, is a sail-boat but the present invention may also be employed in a motor boat (not shown)

The hull 2, in the present embodiments of the invention, is a catamaran hull as illustrated in the drawings. However, the present invention is also applicable to mono-hulls. The hull 2 generally comprises a bridge member 4 and first and second hull members 2a, 2b fixedly attached to the bridge member 4 such that the first and second hull members 2a, 2b are secured in parallel spaced relationship with respect to each other. The hull members 2a, 2b in the present embodiment are symmetrical in plan form (as shown in the figures) but may be replaced by catamaran hull members which are asymmetrical in plan-form. In either case, the hull 2 is preferably symmetrical about its central longitudinal axis. The hull 2 is formed of composite materials (such as, for example, glass fibre reinforced plastic laid-up on a foam core), which allow construction of a light-weight high-strength structure, with a smoothly streamlined shape.

The two outrigger bodies 3 are disposed on respective opposite sides of the hull, as shown in the drawings, and are also formed of composite materials, such as, for example, glass fibre reinforced plastic laid-up on a foam core.

The outrigger bodies 3 are substantially shorter and narrower than the hull 2. Additionally, the elevation of the keel 5 of each outrigger body 3 is designed to approximately correspond to the waterline of the hull 2 (see FIG. 4). As a result, the displacement of each outrigger body 3 is dependent on the degree of list of the water-craft 1. In the case of a sail-boat, as illustrated in the figures, wind-induced list of the water-craft means that only the leeward outrigger body will displace water, while the windward outrigger body will tend to be held above the water surface.

Consequently, during long tacks, the windward outrigger body may be retracted. Such retraction can he completed within approximately 5–10 seconds.

Figure 2:
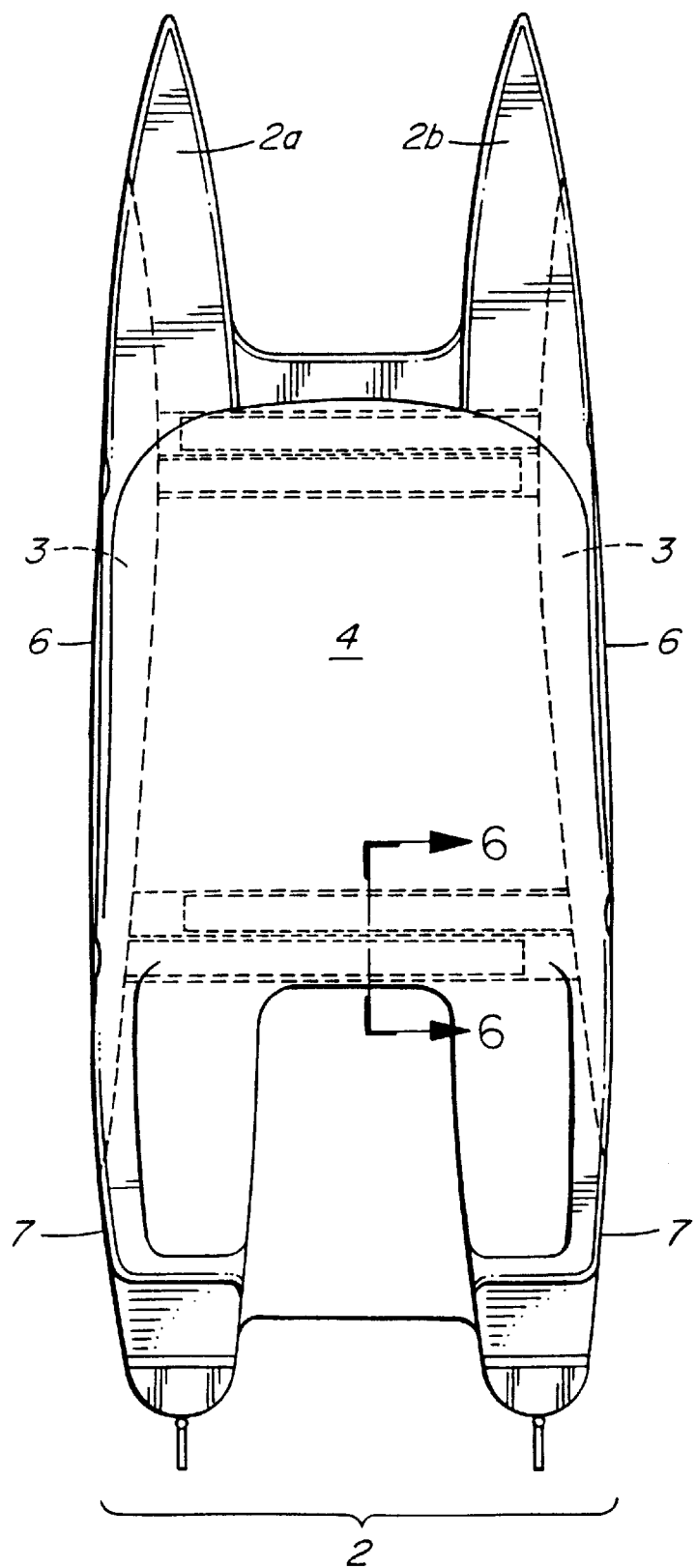
FIG. 2 shows a top view of the water-craft of FIG. 1 in which outrigger bodies are shown in retracted positions.
Figure 3:
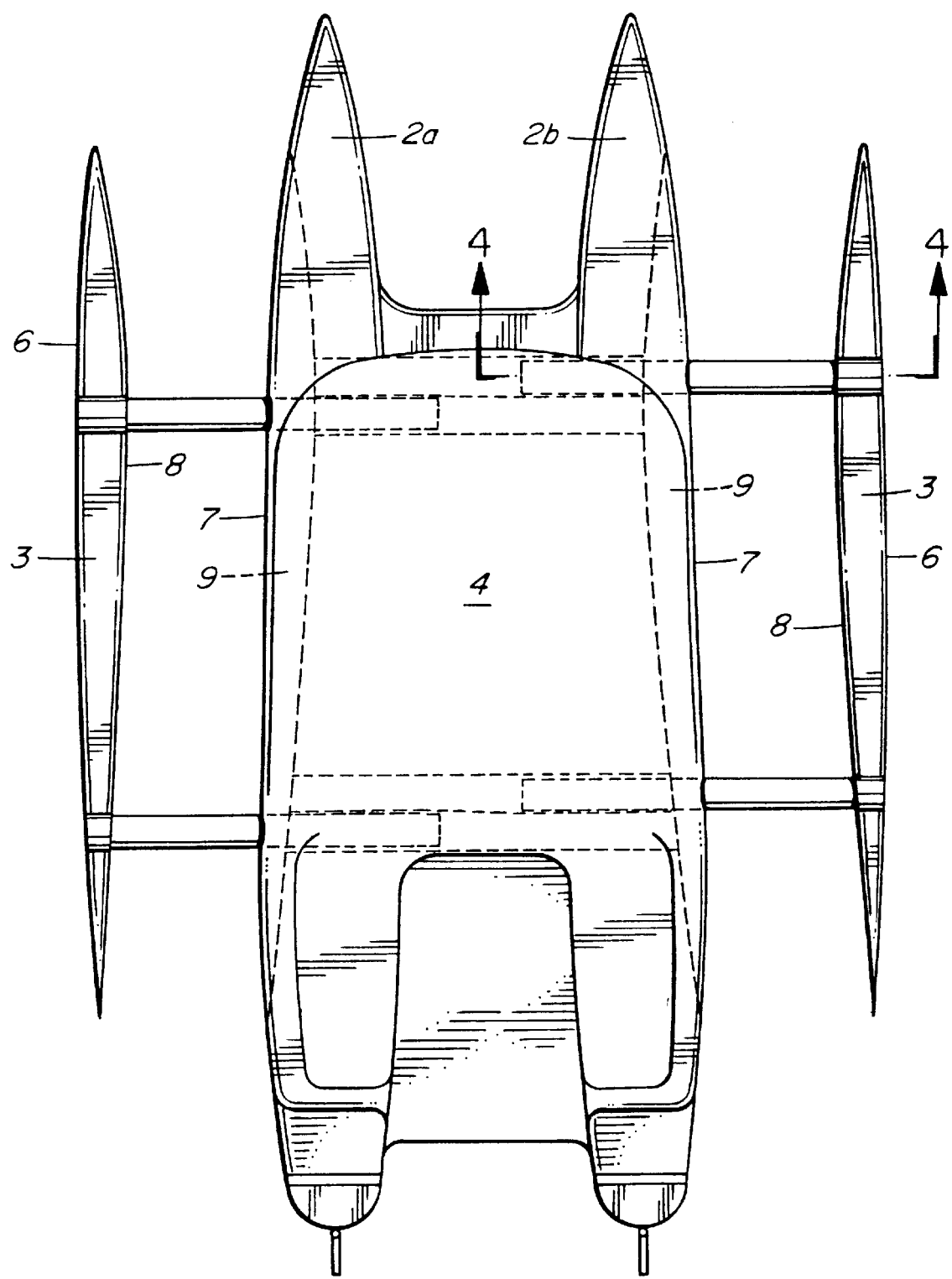
FIG. 3 shows a top view of the water-craft of FIG. 1 in which the outrigger bodies are shown in extended positions.

Referring to FIGS. 2 and 3, an outboard or outer side 6 of each outrigger body 3 is contoured to match the streamline contour of the outboard sides 7 of the hull 2. An inboard or inner side 8 of each outrigger body 3 is provided with a convexly curved surface defining a hydrofoil shape in plan-form. By means of this hydrofoil shape, water flowing along the length of the outrigger body produces a hydrodynamic thrust force directed toward the hull. Thus, in the case of a sail-boat, the leeward outrigger body displaces water, and movement of the water-craft through the water induces a hydrodynamic thrust which is directed toward the hull 2, that is, to windward. The windward outrigger body, in contrast, is generally held clear of the water, and thus does not generate any countervailing hydrodynamic thrust. As a consequence, the hydrodynamic thrust generated by the leeward outrigger body increases the water-craft's ability to resist wind forces, and effectively eliminates the requirement for a daggerboard or the like. This, in turn, allows the water-craft to be constructed with a comparatively low draught, thereby permitting the waiter-craft to be operated safely in shallow water.

Each outrigger body 3 is securely retained in fixed parallel relation to the hull 2, and is laterally movable with respect to the hull 2 between a retracted position (see FIG. 2) and an extended position (see FIG. 3). In order to facilitate complete retraction of the outrigger bodies 3, each side of the hull 2 is provided with corresponding concave recesses 9 having a shape which is complementary to that of the inner side 8 of the outrigger bodies. Accordingly, when the outrigger body 3 is moved to its retracted position, the outrigger body 3 nests snugly into the recess 9 of the hull 2 and the outboard surface 6 of the outrigger body 3 blends into the streamline contour of the hull 2 to thus define a composite streamlined hull surface contour. Under these conditions, the outrigger body 3 effectively ceases to interact with the water as an outrigger, so that the water-craft 1 performs essentially as if the outrigger body 3 were an integral part of the main hull 2.

Figure 4:
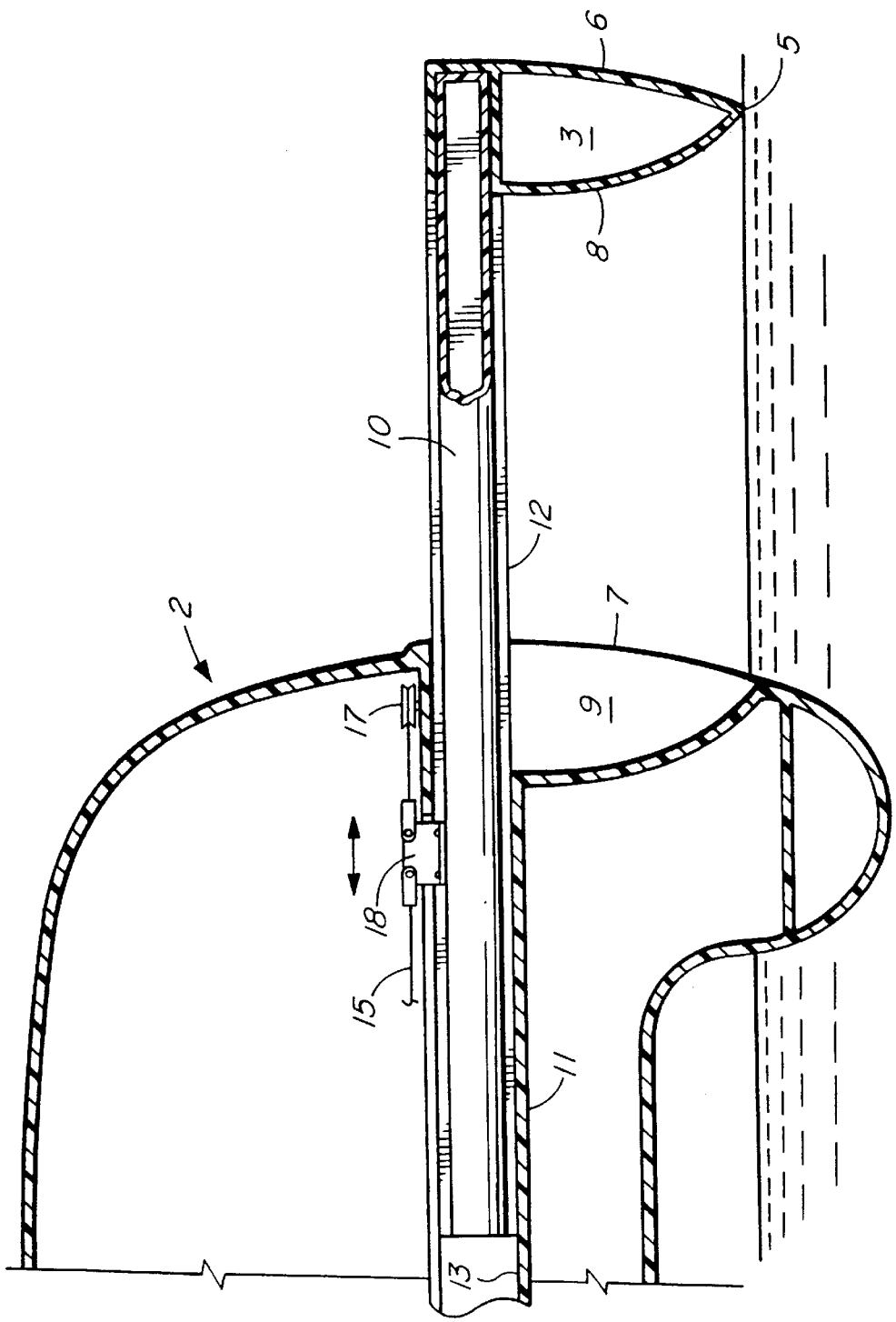
FIG. 4 is partial cross-sectional view taken along line 4—4 in FIG. 3
Figure 5:
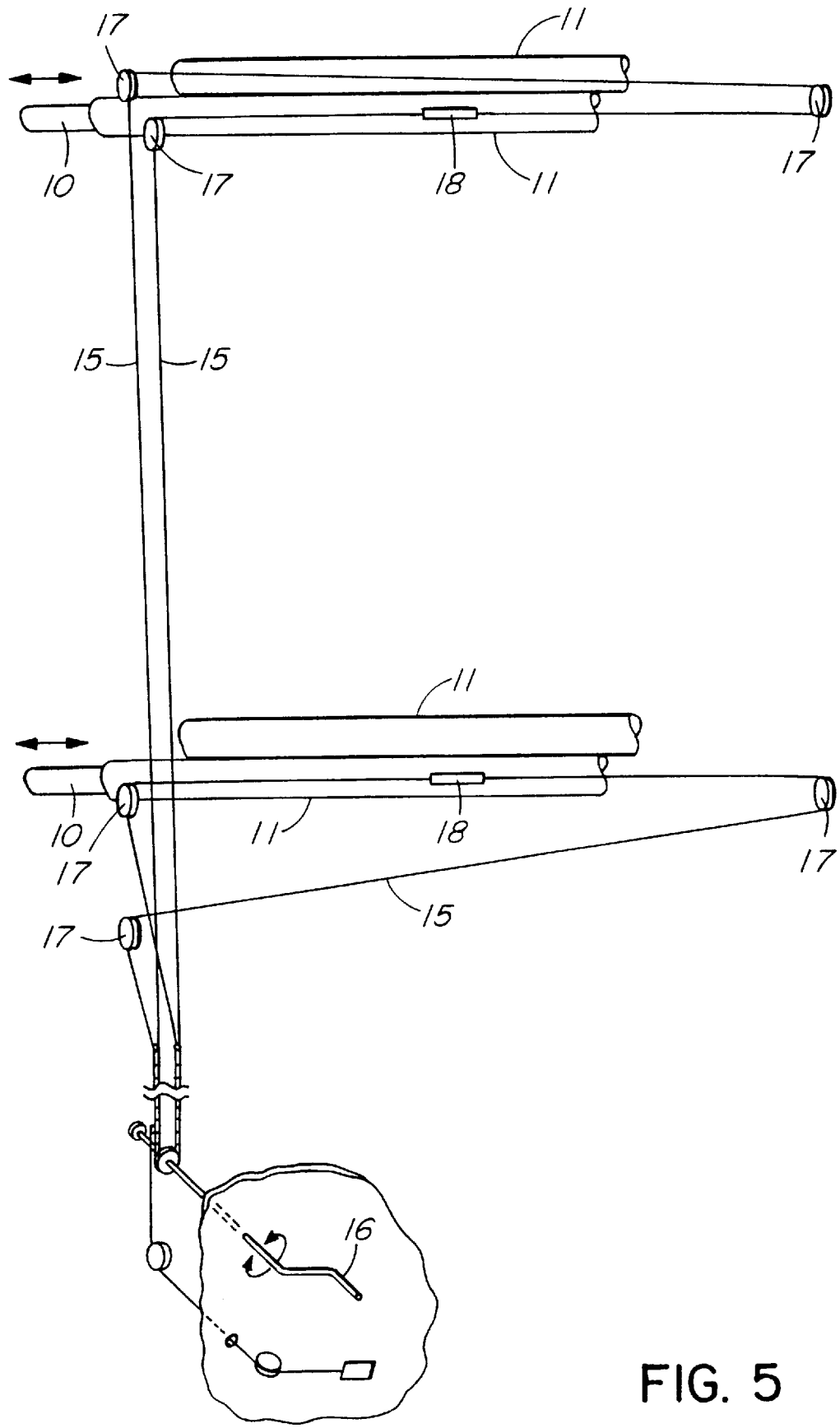
FIG. 5 is a schematic illustration of a mechanism for extending and retracting one of the outrigger bodies.

Referring now to FIG. 4, each body 3 is rigidly mounted on the free ends of a pair of support arms 10 (note that more or fewer support arms may be used). The support arms 10 extend transversely of the interior space of the hull 2 and project laterally from the hull 2. Each support arm 10 is conveniently mounted within an arm support in the form of a respective slider tube 11 which extends at least partially across the interior space of the hull 2. The support arm and slider tube can be composed of any suitable materials, such as, for example, aluminum alloy, steel, or a composite material. The slider tubes 11 are securely attached to the structure of the hull 2 so as to effectively preclude movement between the hull 2 and the slider tubes 11. By this means, the outrigger body 3 can be selectively retracted and extended by slidably displacing the support arms 10 longitudinally within their respective slider tubes 11 in a telescopic manner. Co-operation between outer surfaces 12 of each support arm 10 and the inner surfaces 13 of the corresponding slider tubes 11 effectively transfers forces between the outrigger bodies 3 and the hull 2, while resisting angular distortions in the structure. Thus, the support arms 10 can be extended or retracted as desired to adjust the stability of the water-craft 1, while the water-craft is under way and without changing the angular orientation of the outrigger bodies 3 with respect to the hull 2. FIG. 5 shows an outrigger body or float displacement drive or system 14 provided for extending and retracting one of the outrider bodies. The drive 14 comprises a system of cables 15 connected to a hand crank or winch 16 via suitably arranged pulleys 17. The cables 15 are be attached to each of the support arms 10 by way of respective tabs 18 mounted on the support arms 10 (such as, for example, by welding) and extending through suitable slots formed in the respective slider tubes 11. This arrangement allows the outrigger bodies 3 to be extended and retracted as desired from the cockpit 19 of the water-craft 1. Conveniently, two independent float displacement drives 14 are provided, so that the outrigger bodies 3 can be retracted and extended independently of one another, For example, when the water-craft 1 is under way, it will often be desirable to at least partially extend the leeward-side outrigger 3 can be fully extended to provide increased stability and a keel-like action as described above. The windward-side outrigger body 3, on the other hand, can be fully retracted to minimize wind and water resistance.

As shown in FIG. 5, the cable system 15 is connected to crank 16 by a chain 31 and a sprocket 32. A line 33 attached at one end to the chain 31 is guided by pulleys 34 and can be retained in a clamping cleat 35 for thereby retaining the respective outrigger body.

Figure 6:
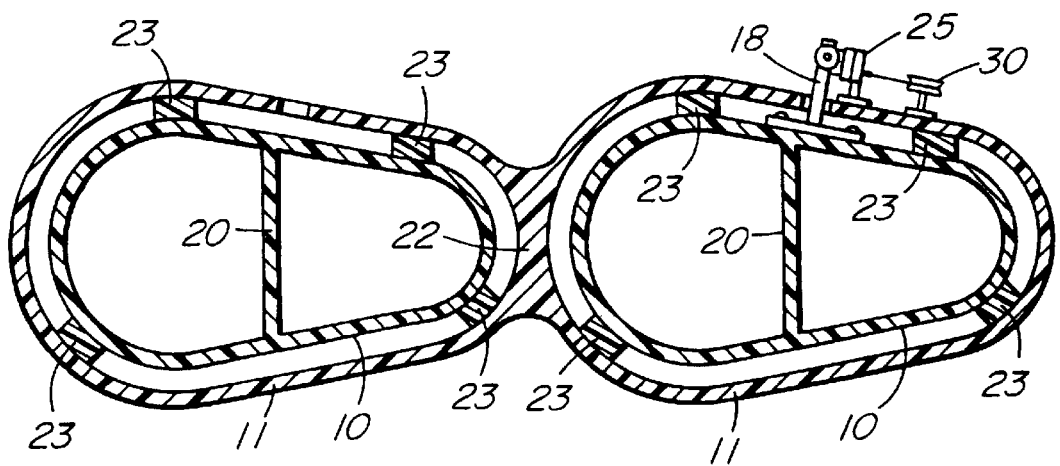
FIG. 6 is a view in cross-section along the line 6—6 of FIG. 2.
Figure 7:
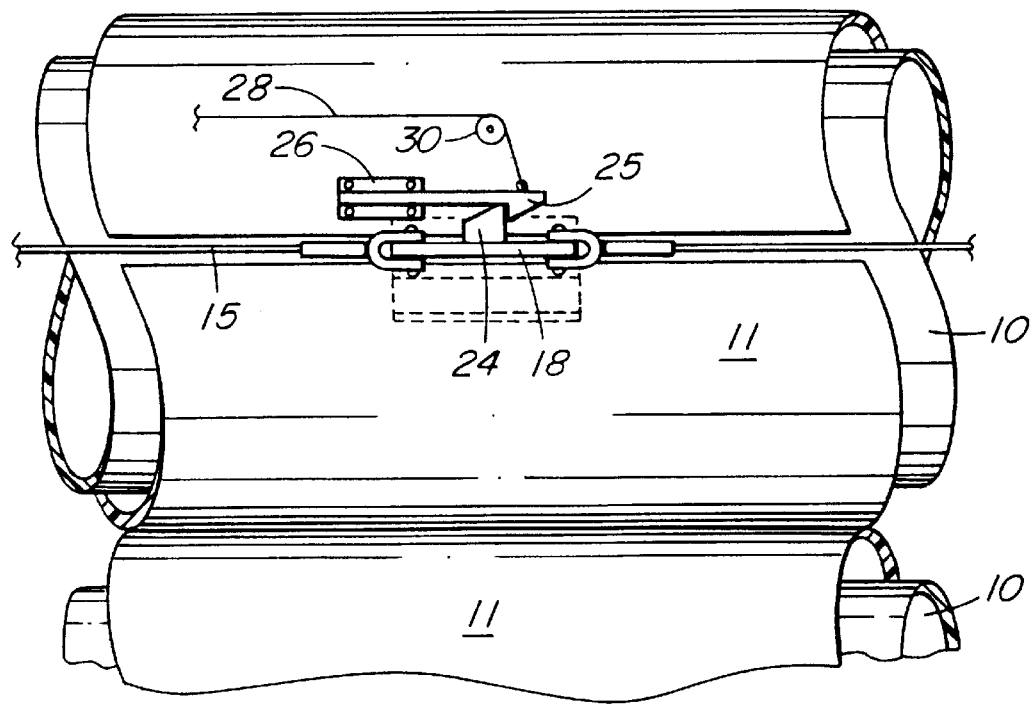
FIG. 7 shows broken-away view of parts of support arms and slider tubes of the watercraft of FIG. 1.

As can be seen from FIG. 6, the support arms 10 are of elongate cross-sectional shape and are each provided with an internal transverse reinforcement wall 20. The slider tubes 11 have cross-sectional shapes which correspond to those of the support arms 10 and the slider tubes 11 are joined together in pairs, by bridge portions 22. Spacers 23 of low friction polytetrafluorethylene are provided between the arms 10 and their tubes 11.

The tabs 18 are each provided with a laterally projecting catch 24 which cooperates with a spring latch 25 for releasibly retaining the respective support arm in its retracted position, the spring latch 25 being secured to a mounting plate 26 on the respective slider tube 11. For releasing the spring latch 25, there is provided a line 28 extending from a convenient location (not shown) in the interior space of the hull 2 and over a pulley 30, rotatably mounted on the slider tube 11, to the spring latch 25. By pulling on the line 28, an operator can release the spring latch 25 from the catch 24 so as to allow the respective support arm 10 to be telescopically extended from its slider tube 11 by the displacement drive 14.

It will be appreciated that the above embodiments may be varied without departing from the scope of the appended claims. For example, it will be apparent that the extension and retraction of the outrigger bodies can be effected by means other than al hand crank or winch. In particular, powered systems, such as, for example, hydraulic or pneumatic pistons and/or motor driven drive screws may also be suitably employed. Furthermore, the slider tubes 11 can each be replaced by a suitable track for accommodating rollers attached to the base end of the support arm. Corresponding rollers could then be located at the outboard end of the tracks to engage upper and lower surfaces of the support arms. The rollers, by respectively running along the tracks and the support arms, would allow the support arms to move laterally with minimum friction, while effectively transferring forces and preventing angular distortions.

I claim:

1. A water-craft comprising:
    a catamaran hull including a bridge member and first and second hull members fixedly attached to said bridge member such that said first and second hull members are secured in parallel separated relationship with respect to each other;
    a first outrigger body member operatively mounted in fixed parallel relation to said first hull member, said first outrigger body being laterally movable with respect to said hull between an extended position and a retracted position; and
    a second outrigger body member operatively mounted in fixed parallel relation to said second hull member, said second outrigger body being laterally movable with respect to said hull between an extended position and a retracted position.

2. A water-craft as defined in claim 1, further comprising support arms supporting said outrigger bodies, said support arms each having a base end slidably mounted to said hull for lateral movement of each of said support arm between a respective extended position and a respective retracted position, said support arms also having free ends for substantially rigidly supporting said first and second outrigger bodies in fixed parallel relation to said hull.

3. A water-craft as defined in claim 2, further comprising slider tubes rigidly affixed to said hull, said base ends of said support arms being slidably disposed within respective ones of said slider tubes, said slider tubes each having an inner wall and said support arms each having an outer wall bearing against a respective one of said inner walls so as to substantially prevent angular rotation of said support arms.

4. A water-craft as defined in claim 1, wherein said first and second outrigger bodies each define a hydrofoil shape in plan-form, such that water flowing longitudinally with respect to said outrigger bodies generates respective hydrodynamic thrust forces generally directed toward said hull.

5. A water-craft as defined in claim 1, comprising respective first and second float displacement drives for independently moving said first and second outrigger bodies to any desired position between said retracted and extended positions.

6. A water-craft as defined in claim 1, wherein each of said first and second outrigger bodies has a first said facing a respective one of said hull members and an oppositely facing second side; said first side being shaped to fit against said respective hull member, when in the retracted position; and said first and second outrigger bodies being shaped to co-operate with said hull members to define therewith streamlined hull surface contours when said first and second outrigger bodies are in the retracted positions.

7. A water-craft as defined in claim 6, wherein said hull members include respective first and second recesses having shapes complementary to the shapes of said first sides of said first and second outrigger bodies for receiving said first and second outrigger bodies when retracted.

8. A water-craft as defined in claim 7, comprising respective first and second float displacement drives capable of moving said outrigger bodies independently of one another to any desired position between their respective retracted and extended positions.

* * * * *